US012700204B2

(12) United States Patent  
Guerrero et al.

(10) Patent No.: US 12,700,204 B2  
(45) Date of Patent: Aug. 4, 2026

(54) 3D-AWARE TRANSFORMATIONS USING A DIFFUSION MODEL

(71) Applicant: Adobe Inc., San Jose, CA (US)

(72) Inventors: Paul Guerrero, London (GB); Yannick Hold-Geoffroy, Quebec City (CA); Matheus Gadelha, San Jose, CA (US); Karran Pandey, Toronto (CA)

(73) Assignee: Adobe Inc., San Jose, CA (US)

( * ) Notice: Subject to any disclaimer, the term of this patent is extended or adjusted under 35 U.S.C. 154(b) by 133 days.

(21) Appl. No.: 18/889,095

(22) Filed: Sep. 18, 2024

(65) Prior Publication Data

US 2026/0080644 A1     Mar. 19, 2026

(51) Int. Cl.  
*G06T 19/20* (2011.01)  
*G06T 7/50* (2017.01)

(52) U.S. Cl.  
CPC ............... *G06T 19/20* (2013.01); *G06T 7/50* (2017.01); *G06T 2219/2016* (2013.01)

(58) Field of Classification Search  
None  
See application file for complete search history.

(56) References Cited

U.S. PATENT DOCUMENTS

| | | | | | |
|---|---|---|---|---|---|
| 9,070,319 | B1 * | 6/2015 | Soni | .......................... | G09G 5/14 |
| 12,505,269 | B2 * | 12/2025 | Yuan | ....................... | G06F 30/27 |
| 2012/0327078 | A1 * | 12/2012 | Liao | ........................ | G06T 7/593 |
| | | | | | 345/419 |
| 2025/0278896 | A1 * | 9/2025 | Su | ............................ | G06T 5/70 |

OTHER PUBLICATIONS

Adobe Firefly, Create with Firefly Generative AI, available at https://www.adobe.com/products/firefly.html, 2024, pp. 1-11.  
Avrahami et al., Blended Diffusion for Text-driven Editing of Natural Images, In Proceedings of the Institute of Electrical and Electronics Engineers/CVF Conference on Computer Vision and Pattern Recognition (CVPR), 2022, pp. 18208-18218.

(Continued)

*Primary Examiner* — Talha M Nawaz  
(74) *Attorney, Agent, or Firm* — Kilpatrick Townsend & Stockton LLP

(57) ABSTRACT

Techniques for implementing 3D-aware transformations using a diffusion model are disclosed. A computing system receives an image of a three-dimensional ("3D") object, a text prompt, and a 3D transformation. The computing system generates an initial state for a diffusion model. The computing system generates, using the diffusion model, a second image of the 3D object and intermediate representations of the second image, based on the initial state, a depth map, and the text prompt. The computing system generates 3D representations of the second image based on the intermediate representations, transformed 3D representations of the second image by applying the 3D transformation, and edited intermediate representations. The computing system generates, using the diffusion model and the edited intermediate representations, an edited image of the 3D object, based on the initial state, a second depth map, and the text prompt and outputs the edited image.

20 Claims, 7 Drawing Sheets

(56) References Cited

OTHER PUBLICATIONS

Avrahami et al., SpaText: Spatio-textual Representation for Controllable Image Generation, In Proceedings of the Institute of Electrical and Electronics Engineers/CVF Conference on Computer Vision and Pattern Recognition, Mar. 19, 2023, 29 pages.

Bar-Tal et al., Multidiffusion: Fusing Diffusion Paths for Controlled Image Generation, Available Online at: https://openreview.net/pdf?id=D4ajVWmgLB, Feb. 16, 2023, pp. 1-16.

Betker et al., Improving Image Generation with Better Captions, Computer Science, vol. 2, No. 3, 2023, pp. 1-19.

Bhat et al., Zoedepth: Zero-shot Transfer by Combining Relative and Metric Depth, Available Online at: https://arxiv.org/pdf/2302.12288, Feb. 23, 2023, pp. 1-20.

Brooks et al., Instructpix2pix: Learning to Follow Image Editing Instructions, In Proceedings of the Institute of Electrical and Electronics Engineers/CVF Conference on Computer Vision and Pattern Recognition, Jan. 18, 2023, pp. 1-15.

Chang et al., Muse: Text-To-Image Generation via Masked Generative Transformers, Computer Vision and Pattern Recognition, Jan. 2, 2023, pp. 1-22.

Chen et al., Sketch2photo: Internet Image Montage, ACM Transactions on Graphics, vol. 28, No. 5, Dec. 1, 2009, pp. 1-10.

Chen et al., Training-Free Layout Control with Cross-Attention Guidance, Available online at: https://arxiv.org/pdf/2304.03373, Nov. 29, 2023, 21 pages.

Crowson et al., VQGAN-CLIP: Open Domain Image Generation and Editing with Natural Language Guidance, In European Conference on Computer Vision, Sep. 4, 2022, pp. 88-105.

Ding et al., Cogview: Mastering Text-to-image Generation via Transformers, Advances in Neural Information Processing Systems, vol. 34, Dec. 6, 2021, pp. 19822-19835.

Epstein et al., Diffusion Self-Guidance for Controllable Image Generation, Advances in Neural Information Processing Systems, Jun. 11, 2023, pp. 1-17.

Frans et al., CLIPDraw: Exploring Text-to-drawing Synthesis Through Language-image Encoders, Advances in Neural Information Processing Systems, vol. 35, Dec. 6, 2022, pp. 1-12.

Gafni et al., Make-a-scene: Scene-based Text-to-image Generation with Human Priors, In European Conference on Computer Vision, Mar. 24, 2022, pp. 89-106.

Ho et al., Classifier-Free Diffusion Guidance, Computer Science, Available online at: https://arxiv.org/pdf/2207.12598, Jul. 26, 2022, pp. 1-14.

Ho et al., Denoising Diffusion Probabilistic Models, Available online at: https://arxiv.org/pdf/2006.11239, Dec. 16, 2020, pp. 1-25.

Ho et al., Video Diffusion Models, Computer Vision and Pattern Recognition, Jun. 22, 2022, pp. 1-15.

Hoiem et al., Automatic Photo Pop-Up, In Association for Computing Machinery Transactions on Computer Graphics, Jul. 1, 2005, 8 pages.

Hong et al., LRM: Large Reconstruction Model for Single Image to 3D, Available online at: https://arxiv.org/pdf/2311.04400, Mar. 9, 2024, pp. 1-25.

Jampani et al., SLIDE: Single Image 3D Photography with Soft Layering and Depth-Aware Inpainting, Available online at: https://arxiv.org/pdf/2109.01068, Sep. 2, 2021, pp. 1-12.

Kholgade et al., 3D Object Manipulation in a Single Photograph Using Stock 3D Models, Association for Computing Machinery Transactions on graphics, vol. 33, No. 4, Jul. 27, 2014, 13 pages.

Kirillov et al., Segment Anything, Available online at: https://arxiv.org/pdf/2304.02643, Apr. 5, 2023, pp. 1-30.

Li et al., GLIGEN: Open-Set Grounded Text-to-Image Generation, In Proceedings of the Institute of Electrical and Electronics Engineers/CVF Conference on Computer Vision and Pattern Recognition, Available online at: https://arxiv.org/pdf/2301.07093, Apr. 17, 2023, pp. 1-21.

Li et al., Image Harmonization with Diffusion Model, Available online at: https://arxiv.org/pdf/2306.10441, Jun. 17, 2023, pp. 1-8.

Liu et al., Grounding DINO: Marrying DINO with Grounded Pre-Training for Open-Set Object Detection, Available online at: https://arxiv.org/pdf/2303.05499, Jul. 19, 2024, pp. 1-33.

Liu et al., Zero-1-to-3: Zero-shot One Image to 3D Object, In Proceedings of the Institute of Electrical and Electronics Engineers/CVF International Conference on Computer Vision, Mar. 20, 2023, pp. 9298-9309.

Lugmayr et al., RePaint: Inpainting using Denoising Diffusion Probabilistic Models, Available online at: https://arxiv.org/pdf/2201.09865, Aug. 31, 2022, pp. 1-25.

Mi et al., im2nerf: Image to Neural Radiance Field in the Wild, Available online at: https://arxiv.org/pdf/2209.04061, Sep. 8, 2022, 12 pages.

Michel et al., Object 3DIT: Language-guided 3D-Aware Image Editing, Available online at: https://arxiv.org/pdf/2307.11073, Jul. 20, 2023, pp. 1-18.

Mokady et al., Null-Text Inversion for Editing Real Images using Guided Diffusion Models, Proceedings of the Institute of Electrical and Electronics Engineers/CVF Conference on Computer Vision and Pattern Recognition, Nov. 17, 2022, pp. 1-20.

Mori et al., Image-to-word Transformation Based on Dividing and Vector Quantizing Images with Words, In First International Workshop on Multimedia Intelligent Storage and Retrieval Management, vol. 2, Oct. 30, 1999, 9 pages.

Mou et al., Dragondiffusion: Enabling Drag-Style Manipulation on Diffusion Models, Available online at: https://arxiv.org/pdf/2307.02421, Nov. 20, 2023, pp. 1-18.

Mou et al., T2I-adapter: Learning Adapters to Dig Out More Controllable Ability for Text-to-image Diffusion Models, The Thirty-Eighth AAAI Conference on Artificial Intelligence, vol. 38, No. 5, Mar. 24, 2024, pp. 4296-4304.

Nguyen-Phuoc et al., BlockGAN: Learning 3D Object-aware Scene Representations from Unlabelled Images, Available online at: https://arxiv.org/abs/2002.08988, Dec. 2, 2020, pp. 1-24.

Nichol et al., GLIDE: Towards Photorealistic Image Generation and Editing with Text-Guided Diffusion Models, Available online at: https://arxiv.org/abs/2112.10741, Mar. 8, 2022, 20 pages.

Niklaus et al., 3D Ken Burns Effect from a Single Image, Association for Computing Machinery Transactions on Graphics, vol. 38, No. 6, Nov. 8, 2019, pp. 184:1-184:15.

Pan et al., Drag Your GAN: Interactive Point-based Manipulation on the Generative Image Manifold, Available online at: https://arxiv.org/pdf/2305.10973, Aug. 6-10, 2023, pp. 1-11.

Park et al., Semantic Image Synthesis with Spatially-Adaptive Normalization, Available online at: https://arxiv.org/pdf/1903.07291, Nov. 5, 2019, pp. 1-19.

Patashnik et al., StyleCLIP: Text-Driven Manipulation of StyleGAN Imagery, Available online at: https://arxiv.org/pdf/2103.17249, Mar. 31, 2021, pp. 1-18.

Perez et al., Poisson Image Editing, In Seminal Graphics Papers: Pushing the Boundaries, vol. 2, Aug. 1, 2023, pp. 313-318.

Po et al., Compositional 3D Scene Generation using Locally Conditioned Diffusion, Available online at: https://arxiv.org/pdf/2303.12218, Mar. 23, 2023, 14 pages.

Quattoni et al., Learning Visual Representations using Images with Captions, Available online at: https://people.csail.mit.edu/mcollins/papers/cvpr2007.pdf, Jun. 17, 2007, 8 pages.

Radford et al., Learning Transferable Visual Models From Natural Language Supervision, Available online at: https://arxiv.org/pdf/2103.00020, Feb. 26, 2021, pp. 1-48.

Ramesh et al., Hierarchical Text-Conditional Image Generation with CLIP Latents, Available online at: https://arxiv.org/pdf/2204.06125, Apr. 13, 2022, pp. 1-27.

Rombach et al., High-Resolution Image Synthesis with Latent Diffusion Models, In Proceedings of the Institute of Electrical and Electronics Engineers/CVF Conference on Computer Vision and Pattern Recognition, Apr. 13, 2022, pp. 1-45.

Saharia et al., Palette: Image-to-Image Diffusion Models, Association for Computing Machinery SIGGRAPH 2022 Conference Proceedings, Aug. 7-11, 2022, pp. 1-10.

Saharia et al., Photorealistic Text-to-Image Diffusion Models with Deep Language Understanding, Available online at: https://arxiv.org/pdf/2205.11487, May 23, 2022, pp. 1-46.

(56)         References Cited

OTHER PUBLICATIONS

Shih et al., 3D Photography using Context-Aware Layered Depth Inpainting, Available online at: https://arxiv.org/pdf/2004.04727, Jun. 10, 2020, 15 pages.

Song et al., Denoising Diffusion Implicit Models, International Conference on Learning Representations 2021, Available online at: https://arxiv.org/pdf/2010.02502, Oct. 5, 2022, pp. 1-22.

Song et al., ObjectStitch: Object Compositing with Diffusion Model, Available online at: https://arxiv.org/pdf/2212.00932, Dec. 5, 2022, pp. 1-17.

Srivastava, Multimodal Learning with Deep Boltzmann Machines, Advances in Neural Information Processing Systems, vol. 25, 2012, pp. 1-9.

Suvorov et al., Resolution-Robust Large Mask Inpainting with Fourier Convolutions, Available online at: https://arxiv.org/pdf/2109. 07161, 2021, 11 pages.

Wang et al., Stylediffusion: Controllable Disentangled Style Transfer via Diffusion Models, Available online at: https://arxiv.org/pdf/2308.07863, Aug. 15, 2023, 24 pages.

Wu et al., 3D Shape Nets: A Deep Representation for Volumetric Shapes, In Proceedings of the Institute of Electrical and Electronics Engineers Conference on Computer Vision and Pattern Recognition, Available online at: https://arxiv.org/pdf/1406.5670, Apr. 15, 2015, pp. 1-9.

Yu et al., Scaling Autoregressive Models for Content-Rich Text-to-Image Generation, Transactions on Machine Learning Research, vol. 2, No. 3, Jun. 22, 2022, pp. 1-49.

Zeng et al., SceneComposer: Any-Level Semantic Image Synthesis, Available online at: https://arxiv.org/pdf/2211.11742, Nov. 21, 2022, pp. 1-17.

Zhang et al., Adding Conditional Control to Text-to-image Diffusion Models, In Proceedings of the Institute of Electrical and Electronics Engineers/CVF International Conference on Computer Vision, Available online at: https://arxiv.org/pdf/2302.05543, Nov. 26, 2023, 12 pages.

Zhang et al., The Unreasonable Effectiveness of Deep Features as a Perceptual Metric, In Proceedings of the Institute of Electrical and Electronics Engineers Conference on Computer Vision and Pattern Recognition, Apr. 10, 2018, pp. 1-14.

Zheng et al., Interactive Images: Cuboid Proxies for Smart Image Manipulation, Association for Computing Machinery Transactions on Computer Graphics, vol. 31, No. 4, Jul. 1, 2012, 11 pages.

* cited by examiner

200

```
┌─────────────────────────────────────────────────────────────────────┐
│        RECEIVE A FIRST IMAGE OF A THREE-DIMENSIONAL (3D) OBJECT        │
│                         AND A TEXT PROMPT                              │
│                              210                                      │
└─────────────────────────────────────────────────────────────────────┘
                                 │
                                 ▼
┌─────────────────────────────────────────────────────────────────────┐
│       RECEIVE AN INDICATION OF A 3D TRANSFORMATION OF THE 3D OBJECT    │
│                              220                                      │
└─────────────────────────────────────────────────────────────────────┘
                                 │
                                 ▼
┌─────────────────────────────────────────────────────────────────────┐
│  GENERATE INFORMATION ABOUT AN INITIAL STATE FOR A DIFFUSION MODEL     │
│                     USING THE FIRST IMAGE                              │
│                              230                                      │
└─────────────────────────────────────────────────────────────────────┘
                                 │
                                 ▼
┌─────────────────────────────────────────────────────────────────────┐
│  GENERATE, USING THE DIFFUSION MODEL, A SECOND IMAGE OF THE 3D OBJECT  │
│  AND ONE OR MORE FIRST INTERMEDIATE REPRESENTATIONS OF THE SECOND      │
│  IMAGE, BASED ON THE INFORMATION ABOUT THE INITIAL STATE, A FIRST      │
│  DEPTH MAP CORRESPONDING TO THE FIRST IMAGE, AND THE TEXT PROMPT       │
│                              240                                      │
└─────────────────────────────────────────────────────────────────────┘
                                 │
                                 ▼
┌─────────────────────────────────────────────────────────────────────┐
│  GENERATE ONE OR MORE 3D REPRESENTATIONS OF THE SECOND IMAGE BASED ON  │
│       THE ONE OR MORE FIRST INTERMEDIATE REPRESENTATIONS               │
│                              250                                      │
└─────────────────────────────────────────────────────────────────────┘
                                 │
                                 ▼
                          (   2B   )
```

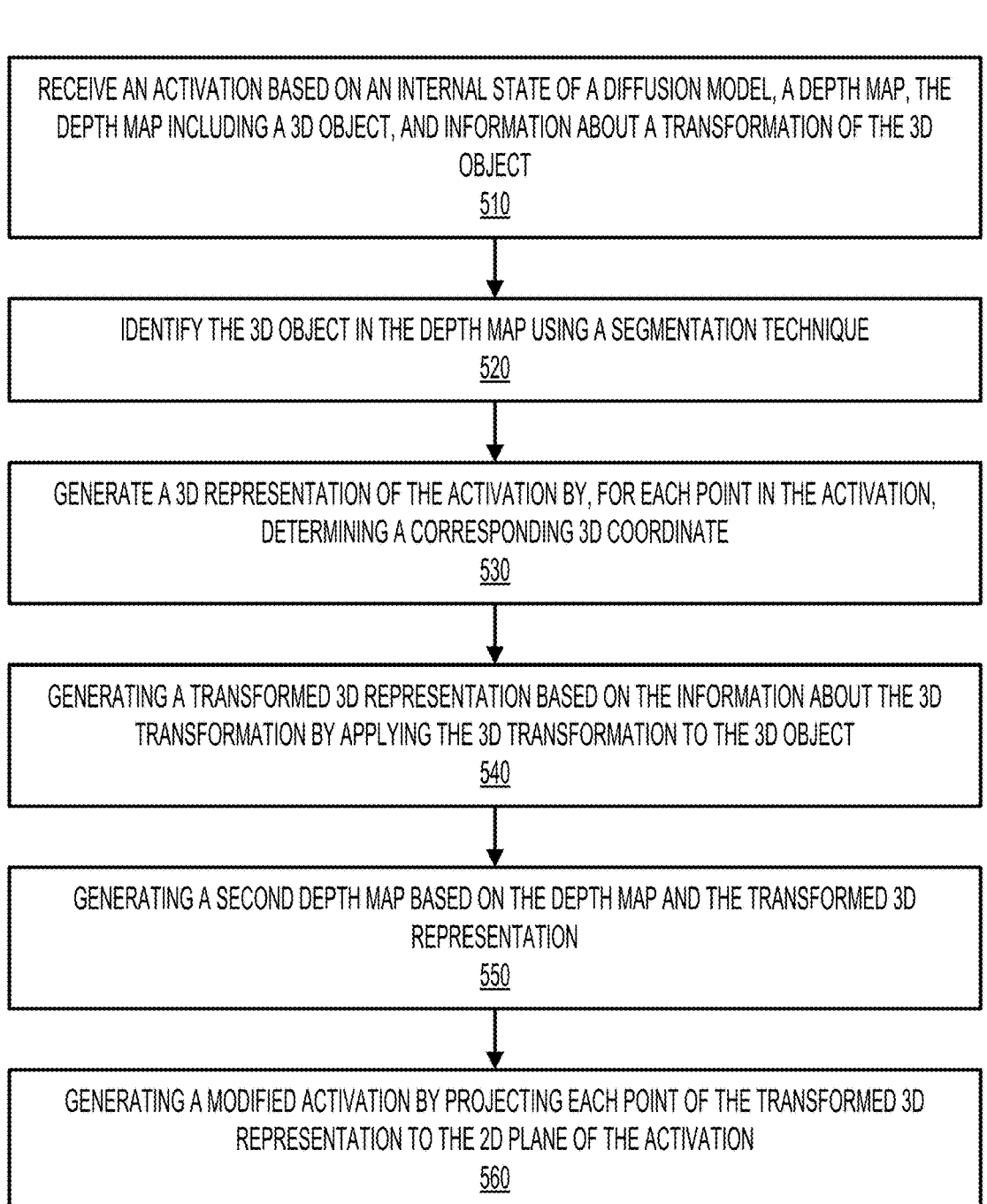

500

RECEIVE AN ACTIVATION BASED ON AN INTERNAL STATE OF A DIFFUSION MODEL, A DEPTH MAP, THE DEPTH MAP INCLUDING A 3D OBJECT, AND INFORMATION ABOUT A TRANSFORMATION OF THE 3D OBJECT
510

IDENTIFY THE 3D OBJECT IN THE DEPTH MAP USING A SEGMENTATION TECHNIQUE
520

GENERATE A 3D REPRESENTATION OF THE ACTIVATION BY, FOR EACH POINT IN THE ACTIVATION, DETERMINING A CORRESPONDING 3D COORDINATE
530

GENERATING A TRANSFORMED 3D REPRESENTATION BASED ON THE INFORMATION ABOUT THE 3D TRANSFORMATION BY APPLYING THE 3D TRANSFORMATION TO THE 3D OBJECT
540

GENERATING A SECOND DEPTH MAP BASED ON THE DEPTH MAP AND THE TRANSFORMED 3D REPRESENTATION
550

GENERATING A MODIFIED ACTIVATION BY PROJECTING EACH POINT OF THE TRANSFORMED 3D REPRESENTATION TO THE 2D PLANE OF THE ACTIVATION
560

FIG. 5

3D-AWARE TRANSFORMATIONS USING A DIFFUSION MODEL

TECHNICAL FIELD

This disclosure generally relates to three-dimensional ("3D") graphics editing and processing, and more specifically, to systems and methods for implementing 3D-aware transformations using a diffusion model.

BACKGROUND

Diffusion models can be used to generate images from a text input. Such models can produce photo-realistic outputs, complex, high-resolution images, or support various forms of conditional generation. Pretrained diffusion models can be adapted to various image processing tasks, including filling in missing parts of an image or "in-painting," extending an image beyond its original borders or "out-painting," enhancing image resolution (e.g., super-resolution), or removing noise to improve image quality (e.g., denoising).

Finer-grained control over the generative process, in addition to the control afforded through the text input, include methods such as regional prompting or including additional user-provided information in generated images such as depth maps or edges. Some methods for editing generated images include synthesizing images from semantic segmentation maps, using text-annotated layouts, or text-guided image editing. However, these methods, particularly when used in conjunction with diffusion models, may not preserve the appearance of the unedited image.

SUMMARY

Some examples described herein relate to a method performed by one or more processing devices, including receiving a first image of a 3D object and a text prompt. The method further includes receiving an indication of a 3D transformation of the 3D object. The method further includes generating information about an initial state for a diffusion model using the first image. The method further includes generating, using the diffusion model, a second image of the 3D object and one or more first intermediate representations of the second image, based on the information about the initial state, a first depth map corresponding to the first image, and the text prompt. The method further includes generating one or more 3D representations of the second image based on the one or more first intermediate representations. The method further includes generating one or more transformed 3D representations of the second image by applying the 3D transformation to each of the one or more 3D representations. The method further includes generating a second intermediate representation for each of the transformed 3D representations. The method further includes generating, using the diffusion model and the one or more second intermediate representations, a third image of the 3D object, based on the information about the initial state, a second depth map, and the text prompt. The method further includes outputting the third image.

Some examples described herein relate to a system including one or more processors and one or more computer-readable storage media storing instructions which, when executed by the one or more processors, cause the one or more processors to perform operations including receiving a first image of a 3D object and a text prompt. The operations further include receiving an indication of a 3D transformation of the 3D object. The operations further include generating information about an initial state for a diffusion model using the first image. The operations further include generating, using the diffusion model, a second image of the 3D object and one or more first intermediate representations of the second image, based on the information about the initial state, a first depth map corresponding to the first image, and the text prompt. The operations further include generating one or more 3D representations of the second image based on the one or more first intermediate representations. The operations further include generating one or more transformed 3D representations of the second image by applying the 3D transformation to each of the one or more 3D representations. The operations further include generating a second intermediate representation for each of the transformed 3D representations. The operations further include generating, using the diffusion model and the one or more second intermediate representations, a third image of the 3D object, based on the information about the initial state, a second depth map, and the text prompt. The operations further include outputting the third image.

Some examples described herein relate to a non-transitory computer-readable medium storing instructions that, when executed by one or more processors, cause the one or more processors to perform operations including receiving a first image of a 3D object and a text prompt. The operations further include receiving an indication of a 3D transformation of the 3D object. The operations further include generating information about an initial state for a diffusion model using the first image. The operations further include generating, using the diffusion model, a second image of the 3D object and one or more first intermediate representations of the second image, based on the information about the initial state, a first depth map corresponding to the first image, and the text prompt. The operations further include generating one or more 3D representations of the second image based on the one or more first intermediate representations. The operations further include generating one or more transformed 3D representations of the second image by applying the 3D transformation to each of the one or more 3D representations. The operations further include generating a second intermediate representation for each of the transformed 3D representations. The operations further include generating, using the diffusion model and the one or more second intermediate representations, a third image of the 3D object, based on the information about the initial state, a second depth map, and the text prompt. The operations further include outputting the third image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 2A-2B show a flow diagram of an example process for using 3D-aware transformations using a diffusion model, according to some examples of the present disclosure.

FIG. 5 is a flow diagram of an example process for editing intermediate representations for 3D-aware transformations using a diffusion model, according to some examples of the present disclosure.

DETAILED DESCRIPTION

Figure 1:
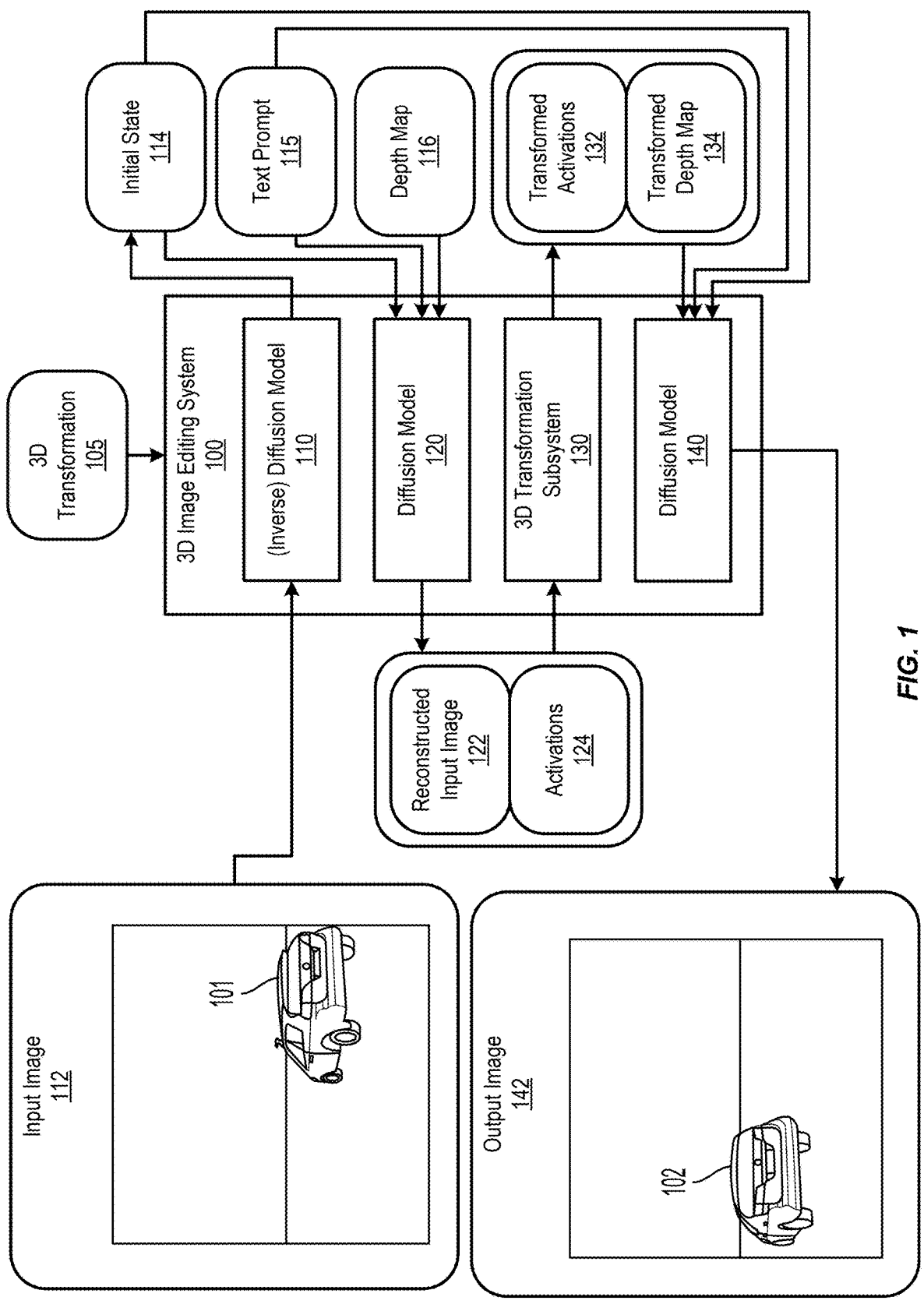
FIG. 1 is a diagram of an example 3D image editing system implementing 3D-aware transformations using a diffusion model, according to some examples of the present disclosure.

Diffusion models are a class of generative machine learning ("ML") models that are trained to iteratively refine random noise into high-fidelity images. Diffusion models can be trained by learning the reverse process of gradually adding noise to data. During inference, the high-fidelity images are generated by iteratively denoising random noise. The recent widespread availability of diffusion models has enabled the generation of production-quality imagery of all kinds from simple text prompts by graphic artists.

Despite the high quality of the generated images, existing approaches have only limited support for object-centric editing. In object-centric editing, the 3D composition of objects featured in images can be changed, while still preserving their identity. Existing approaches to object-centric editing may involve editing the pixel values of the generated images. For example, the existing approaches may involve cutting and pasting objects to desired locations using object masks and then regenerating the background; using gradient domain edits with some identity control; or using novel view synthesis with fine-tuned diffusion models that are costly to train and can reduce model generality. These "image space" approaches may rely on maintaining the same pixel intensities (e.g., brightness or color values) between edits to preserve object identity.

These approaches are particularly restrictive for 3D object edits involving translations, rotations, and changes in scene perspective. For example, consider an image generated by a diffusion model including a car. Moving, rotating, or scaling the car may be difficult to accomplish using the diffusion model if the identity of the car has to be retained, since the regenerated images may not capture complex light and shading effects or changes in perspective that cannot be generally achieved by enforcing object pixel intensity invariance used in image space identity control. In other words, the car may look quite different following each edit. Moreover, the existing approaches may not provide any 3D-aware controls that allow artists to interact with and manipulate 3D properties of objects in an image. A 3D-aware control is one that enables an artist to perform 3D transformations on a 2D image of a 3D object.

These challenges may be overcome using the techniques for implementing 3D-aware transformations using diffusion models described herein. The techniques can be used to perform 3D-aware edits directly on 3D objects pictured in images generated by a diffusion model or in photos that can be inverted into a diffusion model. The 3D-aware edits can be applied without recovery of the full scene geometry, materials, or illumination and without solving the inverse graphics problem. An example process in which 3D-aware transformations using diffusion models are used follows to illustrate certain concepts.

Consider the image generated when the text input "draw a photo-realistic picture of a car parked at the beach" is provided to a diffusion model. A computing system, such as a laptop computer executing 3D graphics editing software, receives the generated image and an input from a 3D graphics artist indicative of a desired 3D transformation of the car. For example, the input may be a movement, rotation, or size change of the car indicated using sliders or other suitable user interface ("UI") control. For instance, UI sliders can be used to move the car from right to left and rotate it slightly.

The editing process begins with the computing system generating information about an initial state for a diffusion model based on the generated image. For example, the diffusion model can be "inverted" to recover random noise and other initial state information. The random noise and other initial state information, when supplied as initial conditions to the diffusion model, could be used to regenerate the initial image, along with the text prompt. In this example, the initial state information includes a particular random noise pattern and a particular representation of a blank or empty text input that would result in substantially the same initial image of the car if provided to the diffusion model as input.

The computing system then generates a second image using the diffusion model. This time, the diffusion model receives as input the information about the initial state, the text prompt, and a depth map corresponding to the initial, generated image. The depth map is a representation of the image in which each pixel value represents the distance from the camera to the corresponding point in the scene, effectively describing the 3D structure of the scene shown in the 2D generated image. As the second image is generated, one or more intermediate representations of the second image that are used internally as the diffusion model generates the second image are obtained. For example, the intermediate representations may be the sequential, internal states of the diffusion model as image generation proceeds, sometimes referred to as "activations." In this example, the second image is substantially the same as the initial, input "photo-realistic picture of a car parked at the beach."

The computing system can then generate 3D representations of the second image based on the intermediate representations. For example, the depth map can be used to associate the elements of the intermediate representations (e.g., 2D pixels) with 3D coordinates. The computing system next applies the input 3D transformation to the 3D representations of the second image. An edited intermediate representation can then be generated for each of the transformed 3D representations. In other words, the intermediate representations (e.g., activations) are lifted to a 3D surface, transformed in 3D space, and then projected back into the 2D plane of the image (e.g., edited activations). In this example, the activations are edited such that the intermediate representations of the car are moved from right to left and rotated slightly.

The computing system can then generate, using the diffusion model and the edited intermediate representations, an edited image based on the information about the initial state, a second depth map, and the text prompt. The second depth map can be generated by applying the 3D transformation to the original depth map. The edited image features the transformed 3D object, with its identity preserved through the use of the edited intermediate representations during the diffusion process. The computing system outputs the edited image to the artist. In this example, the edited image is substantially the same as the initial, input "photo-realistic picture of a car parked at the beach" except that the original car is now moved from right to left and rotated slightly.

The techniques disclosed herein for implementing 3D-aware transformations using a diffusion model constitute improvements to the technical fields of three-dimensional ("3D") graphics editing and processing. Prior to the development of these techniques, the technical problem of how to apply 3D edits to 3D objects in images using a diffusion model lacked any satisfactory solution. As described above, existing approaches resulted in a loss of 3D object identity or were too slow and expensive to implement. The techniques disclosed herein enable the application of a 3D-aware edit to a 3D object which can then be re-generated using a diffusion model with the 3D object identity preserved. The approach disclosed is simple and effective, can use pre-trained, "off-the-shelf" diffusion models without fine-tuning or additional training data, and produces plausible results even when the estimated depths have moderate distortions. Moreover, the techniques disclosed herein can enable a range of 3D modifications to objects, such as translations that affect perspective, scaling, and rotations. Computational resources may be conserved because images can be 3D-edited as-is, without the need to reconstruct the scene and re-render the image.

Overview

FIG. 1 is a diagram of an example 3D image editing system 100 implementing 3D-aware transformations using a diffusion model, according to some examples of the present disclosure. The example system 100 may be a hardware or software component of a computing system such as a laptop computer or mobile device. In some examples, the system 100 may be a standalone server configured for providing services for 3D-aware transformations using a diffusion model using a suitable application programming interface ("API").

The system 100 is depicted with diffusion models 110, 120, and 140. Diffusion model 110 is operated in an inverted mode to recover initial state information, as will be described below. In various examples, the diffusion models 110, 120, and 140 may include one, two, or three different pre-trained diffusion models. Examples of diffusion models that may be used include latent diffusion models such as OpenAI's Dall-E, Google's Imagen, Stability AI's Stable Diffusion, and Midjourney as well as non-latent diffusion models.

The diffusion models 110, 120, and 140 may be self-hosted ML models (e.g., an open source diffusion model locally deployed or deployed to "on-premise" hardware) or externally hosted ML models accessed using a suitable API or hosted in a cloud computing environment. Some of the diffusion models 110, 120, and 140 may be provided by third-parties, again using a suitable API. Any combination of these configurations may be used in examples of the present disclosure.

The system 100 receives an input image 112 of a 3D object as input. The input image 112 includes a 3D object 101. The input image 112 may be generated by a diffusion model but can also be an image of a 3D object generated elsewhere (e.g., a photograph or drawing). In this example shown in FIG. 1, input image 112 includes an image of a 3D object 101. The 3D object 101 is a car that can be rotated, scaled, or translated (i.e., moved). The system 100 also receives as input information about a 3D transformation 105 of the 3D object 101 such as a characterization of a rotation, scaling, or translation of the 3D object 101. These inputs may be provided to the system 100 by way of a suitable GUI executing on a client device used for 3D graphics editing. An example of such a GUI is shown below in FIG. 3.

The input image 112 can be "inverted" using diffusion model 110 to obtain initial state 114. The initial state 114 includes elements such as a null-text encoding and/or an initial noise distribution. Inverting the image to obtain the null-text encoding or an initial noise distribution can involve techniques such as null-text inversion. In null-text inversion, the diffusion model 110 is trained to iteratively refine a null-text encoding based on the input image 112 until the null-text encoding substantially reproduces the input image 112. In this context, the null-text encoding refers to the encoding of a blank or empty string. The inversion process can output a modified null text, in addition to the initial state 114, that may result in a better reconstruction of the input image 112 compared to using only the original null text.

The diffusion model 120 receives the initial state 114 output by the inverted diffusion model 110, along with text prompt 115 (in addition to the null text), and depth map 116. The text prompt 115 may be, for example, a textual description of the input image 112. The depth map 116 can be received as an input (e.g., as an adjunct file generated along with a synthetic 3D scene) or it can be generated from the input image 112 (e.g., using a monocular depth estimator). The null text is used in addition to the text prompt 115, rather than the text prompt 115 by itself. For example, diffusion models may be configured to use the null text (i.e., a blank, encoded text) in addition to the actual text prompt 115. The null text can, in effect, act as a reference or baseline for the diffusion model 120.

The diffusion model 120 generates the reconstructed input image 122 which approximates the input image 112. The activations 124 of the diffusion model 120 during generation of the reconstructed input image 122 are extracted during image generation. The activations 124 are internal representations of the reconstructed input image 122 that may correspond to the internal state of the diffusion model 120 during the image generation process. For instance, the diffusion model 120 may include a series of neural network layers, each characterized by a number of parameters. An activation may be a "snapshot" of all or a subset of the output of the layers constituting the diffusion model 120 during inference. The activation is thus an intermediate representation of the reconstructed input image 122. For example, the diffusion model 120 can transform a noisy image into a denoised image through a number of consecutive layers. The output of each layer can be an activation. In contrast to the fixed network parameters of the diffusion model 120 which are the same for all input images, the activations 124 depend on the input image 112. For example, for a diffusion model 120 that includes a number of neural network layers, each neural network layer can be characterized by fixed parameters such as weights for the neural network nodes that remain fixed following training. During inference, the output of each fixed neural network layer, also referred to as an activation, will generally differ for each input image 112.

The system includes a 3D transformation subsystem 130 that applies the 3D transformation 105 to the activations 124. The 3D transformation subsystem 130 includes components that lift the intermediate representations (e.g., activations 124) to a 3D surface, transform the activations 124 in 3D space, and then project the activations 124 back into the plane of the image to generate transformed activations 132. A transformed depth map 134 is also generated based on the depth map 116 and the 3D transformation 105 by the 3D transformation subsystem 130. Application of the 3D transformation 105 to the intermediate representations (e.g., activations 124) is shown and described in FIGS. 4A-5 below.

The transformed activations 132 and transformed depth map 134 are provided as input to diffusion model 140 along with the initial state 114 and text prompt 115 to generate output image 142. In output image 142, the identity of the transformed 3D object 102, is retained even as the 3D transformation 105 is applied. Here, the 3D object 101 of input image 112 has been moved from right to left and rotated slightly (about 30 degrees to the right), as seen in the depicted of 3D object 102 of output image 142. The output image 142 can be output by the system 100 using a suitable GUI.

Using 3D-Aware Transformations Using a Diffusion Model

Figure 2B:
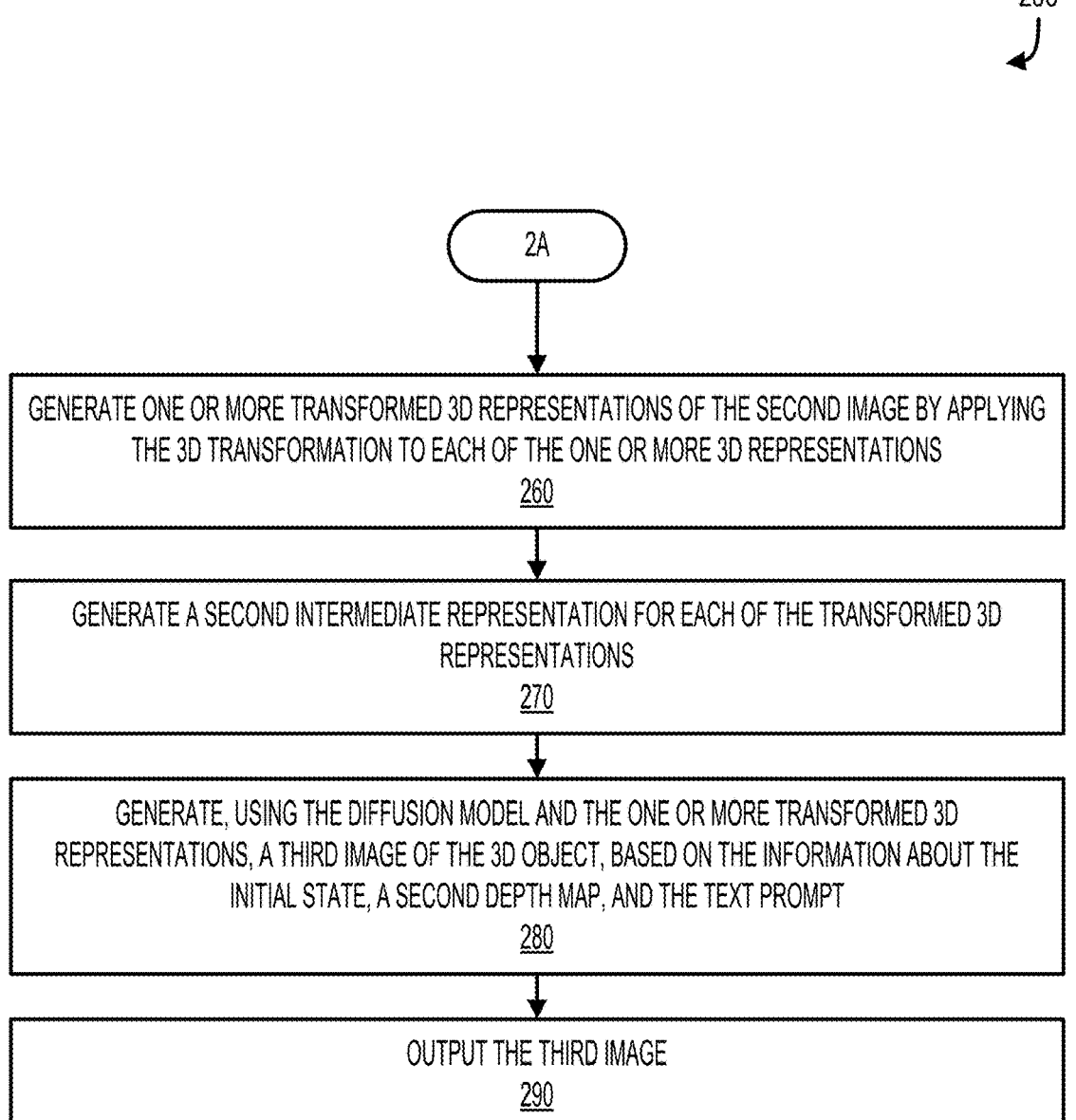

FIGS. 2A-2B show a flow diagram of an example process 200 for using 3D-aware transformations using a diffusion model, according to some examples of the present disclosure. The process 200 depicted in FIGS. 2A-2B may be implemented in software executed by one or more processing units of a processing device, implemented in hardware, or implemented as a combination of software and hardware. The process 200 is intended to be illustrative and non-limiting. The example process herein is described with reference to the 3D editing system 100 depicted in FIG. 1, but other implementations are possible. For example, the example process can be performed by a user of a client device that is in communication with a 3D graphics processing system to perform certain steps. Although FIGS. 2A-2B depict various processing operations occurring in a particular order, the particular order depicted is not required. In certain alternative embodiments, the processing may be performed in a different order, some operations may be performed in parallel, or operations may be added, removed, or combined together.

At block 210, a computing system, such as 3D editing system 100, a client device, 3D graphics processing system, or a combination thereof, receives a first image of a 3D object (e.g., input image 112 of FIG. 1) and a text prompt. If the first image is generated using a diffusion model, then the text prompt is the same prompt used to generate the first image. The first image need not be generated by a diffusion model. The first image may be, for example, a photograph, drawing, scan, etc. generated and/or digitized used any suitable method. In that case, the text prompt can be a description of the first image, comparable to the text prompt that would be used to generate the first image using a diffusion model. In such cases, the computing system can be configured to suggest a text prompt based on the first image. For example, the first image can be provided to a large language model ("LLM") with multi-modal inputs and a prompt including instructions to suggest a text prompt.

At block 220, the computing system receives an indication of a 3D transformation of the 3D object. The transformation may be indicated using suitable UI controls, such as sliders, buttons, finger gestures, or input fields, which allow the user to specify parameters for translation, rotation, or scaling of the 3D object. Other possible 3D transformations include shearing, mirroring, and applying non-uniform scaling or perspective distortions, which can also be indicated using appropriate UI elements. An example of a GUI including controls for indicating the 3D transformation are shown below in FIG. 3.

In some examples, such as when the indication is applied to the first image displayed on a client device executing 3D graphics processing software, the first image, the text prompt, and the indication can be output to a second computing device or service, such as a 3D graphics processing system, to execute the following processing steps. For example, the 3D graphics processing system may be a remote computing system, a local computing system (e.g., an "on-premise" server), or another software component executing on the client device.

At block 230, the computing system (or the 3D graphics processing system) generates information about an initial state for a diffusion model using the first image. The diffusion model is an ML model trained to iteratively refine a noisy input into a high-quality output by learning the underlying data distribution, such as the diffusion models 110, 120, 140 of FIG. 1 described previously. The trained diffusion model can generate images by reversing a defined noise process, starting from a random noise and progressively denoising it to produce a clear and detailed result.

During training, a fixed process adds a random amount of noise to an image x from a set of training images to obtain a noisy image x(t). Formally, this is represented as:

$$\tilde{x}(t) = \sqrt{\alpha(t)}\,x + \sqrt{1 - \alpha(t)}\,\epsilon$$

where $\epsilon \sim \mathcal{N}(0, I)$ is Gaussian noise and $t \in [0, T]$ parametrizes a noise schedule a that determines the amount of noise in $\tilde{x}(t)$ in which $\alpha(0)=1$ corresponds to no noise and $\alpha(T)=0$ corresponds to pure noise.

The diffusion model includes a denoiser component, represented symbolically by $\epsilon_\theta$, and having parameters $\theta$. The denoiser component is trained to predict the noise that minimizes the loss function:

$$\mathcal{L}_{diff} = w(t)\|\epsilon_\theta(\tilde{x}(t); t, y, d) - \epsilon\|_2^2$$

where d represents the depth map, y is an encoding of the text prompt, and w(t) is a weighting scheme for different parameters t. The parameter t is sampled uniformly from [0, T] in each training iteration. Once the denoiser $\epsilon_\theta$ is trained, the function $-\epsilon_\theta(\tilde{x}(t); t, y, d)$ defines a vector field in image space that points towards the natural (e.g., non-noisy) image manifold.

During inference, or image generation, an image can be generated by beginning with noise $\tilde{x}(T)$ and iteratively operating on the noise $\tilde{x}(t)$ using the vector field $-\epsilon_\theta(\tilde{x}(t); t, y, d)$ to step towards the natural image manifold. During this iterative, multi-step process, various approaches to sampling noise to determine the particular trajectory $x_T, x_{T-1}, \ldots, x_0$ with a fixed number T of discrete steps beginning with $x_T := \tilde{x}(T)$ and ending with an image $x_0$ close to the natural image manifold can be used. For example, a Denoising Diffusion Implicit Models ("DDIM") sampler can be used with 50 denoising steps. Other samplers and/or number of denoising steps can be used according to the requirements of the particular 3D graphics application.

During block 230, the information about an initial state for a diffusion model using the first image can be obtained by using the diffusion model operating in a reverse mode of operation, effectively inverting the image with respect to the text prompt by iterating backwards through the diffusion process to determine the initial state. The information about the initial state for the diffusion model may include, for example, a null-text encoding and initial noise. This technique may be referred to as null-text inversion. The null-text encoding and initial noise can be used to substantially reconstruct the input first image in an inference pass, as described below in block 240.

At block 240, the computing system generates, using the diffusion model, a second image of the 3D object and one or more first intermediate representations of the second image, based on the information about the initial state, a first depth map corresponding to the first image, and the text prompt. For example, the second image can be generated by providing the text prompt and the null-text encoding to the diffusion model and setting the initial noise as an initial condition of the image generation process.

The image generation process can be further conditioned on the first depth map. The first depth map can be received as input along with the input first image. For example, the first depth map may be derived from an input image rendered using a synthetic 3D scene. In some examples, the first depth map can be generated using a monocular depth estimator. Monocular depth estimation involves computational techniques for inferring depth information images including the use of ML models to estimate the distance of objects within the image relative to the camera.

The one or more first intermediate representations of the second image may be activations, or intermediate feature maps, obtained from various layers of the neural network used in the diffusion model. For example, during the inference pass of the diffusion model, the activations for all or a subset of the layers or time steps of the diffusion image generation process can be recorded. The activations can be persisted in a filesystem or database or ephemerally stored in, for example, a in-memory cache or other temporary memory.

In some examples, a subset of activations with sufficient resolution to avoid inaccurate guidance may be selected. For example, in a three-layer neural network constituting the denoiser of a latent diffusion model (e.g., Stable Diffusion), activations can be obtained from the last two layers of the decoder of the denoiser. Other components and/or layers can be used to obtain the activations or other intermediate representations, according to the requirements of the particular graphics application.

At block 250, the computing system generates one or more 3D representations of the second image based on the one or more first intermediate representations. For example, the 3D representations may be generated by mapping elements of the first intermediate representations to a 3D coordinate system using a lifting function and based on the first depth map. The elements may be pixels or other units of the intermediate representations. For example, if the intermediate representations are activations derived from the latent space of the diffusion model, the units may be the values of individual neurons or groups of neurons or nodes.

At block 260, the computing system generates one or more transformed 3D representations of the second image by applying the 3D transformation to each of the one or more 3D representations. For example, the computing system can identify a subset of the 3D coordinates lifted in block 250 corresponding to the 3D object. The identified subset of the 3D coordinates can then be transformed by applying the 3D transformation to each 3D point of the subset. Various approaches can be used for identifying the subset of the 3D coordinates corresponding to the 3D object. For example, an image segmentation model may be used to identify the 3D object in the first depth map.

At block 270, the computing system generates a second intermediate representation for each of the transformed 3D representations. For example, the second intermediate representation can be generated by projecting the 3D coordinates, including the subset of 3D coordinates, to a 2D plane. The 2D plane may correspond to the latent space of the diffusion model (e.g., an activation) that can be used to supply initial conditions to the diffusion model for subsequent image generation. The operations described in blocks 250-270 are discussed in detail below in FIGS. 4A-4C.

At block 280, the computing system generates, using the diffusion model and the one or more second intermediate representations, a third image of the 3D object, based on the information about the initial state, the second depth map, and the text prompt. The third image (e.g., output image 142) is generated using a diffusion process that is conditioned on the text prompt and the second depth map. The diffusion process incorporates the information about the initial state including, for example, the null-text encoding and initial noise.

As described above, the null-text encoding and initial noise are sufficient initial conditions to substantially recover the input first image. The second intermediate representations generated in block 270 can be used to "guide" the image generation process given the null-text encoding and initial noise as initial conditions. Guiding the diffusion process to follow the second intermediate representations (e.g., edited activations) influences generation process to preserve the identity of objects from the first image and to follow the edited layout of the 3D object.

Generating the third image may involve configuring the diffusion model to use guidance energy terms including an object guidance energy term and a background guidance energy term. In the context of diffusion models, an energy term is a component of the model's objective function that quantifies the contribution of specific features or constraints to guide the generative process towards desired outcomes. For example, the vector field $\epsilon_\theta(\tilde{x}(t); t, y, d)$ described above can be guided to minimize a custom energy $\mathcal{G}(\tilde{x}(t); t, y, d)$ by biasing each step of the diffusion process with the gradient $\nabla_{\tilde{x}(t)}\mathcal{G}$ of the custom energy. In some examples, the diffusion process can also be biased using classifier-free guidance to more closely follow the text prompt by influencing the vector field $\epsilon_\theta(\tilde{x}(t); t, y, d)$ away from the vector field $\epsilon_\theta(\tilde{x}(t); t, \emptyset, d)$ obtained using the null-text encoding determined in block 230. These two forms of guidance can be combined:

$$\epsilon_\theta(\tilde{x}(t); t, y, d) =$$
$$(1 + \mu)\epsilon_\theta(\tilde{x}(t); t, y, d) - \mu\epsilon_\theta(\tilde{x}(t); t, \emptyset, d) + \lambda\nabla_{\tilde{x}(t)}\mathcal{G}(\tilde{x}(t); t, y, d)$$

in which $\mu$ is the relative weight of the classifier-free guidance (e.g., the guidance from the text prompt) and $\lambda$ is the relative weight of the object or background guidance (e.g., the guidance from the transformed intermediate activations).

The object guidance energy term $\mathcal{G}_o$ is included to provide guidance for the 3D object only. In some examples, the object guidance energy term is the L2 distance between the activations of the diffusion process $\Psi^e$ and the second intermediate representations (e.g., the edited activations). The object guidance energy term $\mathcal{G}_o$ may be given by:

$$\mathcal{G}_o := \sum_{i,t} w_{i,t}^o \sum_u (M_o'(\Psi_{i,t}^e - \Psi_{i,t}'))^2(u)$$

in which:

$$\Psi_{i,t}^e$$

are the activations of the denoiser in the diffusion process; $M_o' := \mathcal{W}[M_o, F] \cdot M_v$ is the valid part of the warped object mask described below with respect to FIG. 4C and $$w_{i,t}^o$$

are per-step and per-layer weights set according to a predetermined schedule during the diffusion process.

The background guidance energy term $\mathcal{G}_b$ is included to influence the generation of the static portions (e.g., background or untransformed 3D objects) of the first image. In some examples, the background guidance energy term $\mathcal{G}_b$ can be given by:

$$\mathcal{G}_b := \sum_{i,t} w_{i,t}^b \frac{\left( \sum_u M_b' \Psi_{i,t}^e(u) - \sum_u M_b' \Psi_{i,t}'(u) \right)^2}{\sum_u M_b'(u)}$$

in which $$M_b' := 1 - M_o' \text{ and } w_{i,t}^b$$

are again per-step and per-layer weights set according to a predetermined schedule during the diffusion process. In this example background guidance energy term, the average of the activations over the image are used since some parts of the static portion of the first image are likely to change during the normal course of the diffusion process due to, for example, lighting or shadows, disocclusions, etc.

The final guidance energy may be given by $\mathcal{G} := \mathcal{G}_o + \mathcal{G}_b$. The gradient of the final guidance energy can be computed and used to bias each step of the diffusion process using, for example, the equation above. The weights $$w_{i,t}^o \text{ and } w_{i,t}^b$$

Can be set according to a predetermined guidance schedule. For example, the predetermined guidance schedule can be set according to certain heuristics or the requirements of the particular application. In some examples, the weights may be set by guiding only for a subset of the diffusion steps, guiding only a subset of layers of the diffusion model neural network for each diffusion step, or by determining a desired level of foreground or background preservation. For instance, the weights may be zeroed after a certain diffusion step (e.g., after the $38^{th}$ of 50 diffusion steps). In another example, the weights can be cycled between neural network layers for each diffusion step, guiding layer 3 in the first step, layer 2 in the second step, both layer 2 and 3 in the third step, and then repeating this pattern. These are just examples and may be used alone, in combination, or according to different heuristics or guiding requirements.

The second depth map can be generated during the editing steps of blocks 250-270 and is described in detail in FIGS. 4A-5 below. For example, the second depth map can be generated by removing the 3D object from the input first image using the subset of 3D coordinates corresponding to the 3D object identified above. Then, an intermediate depth map based on this new image can be generated. The second depth map can be generated based on the intermediate depth map by determining the depth of the transformed 3D object based on the transformed subset of 3D coordinates.

At block 290, the computing system outputs the third image. For example, the edited third image can be shown on a suitable GUI, such as the GUI used to indicate the desired 3D transformation. In some examples, the edited third image can be shown in near-real-time to provide an interactive user experience. Using the techniques of this disclosure, the third image can be substantially the same as the input first, with the exception of the transformed 3D object. The strong priors of the diffusion model, in the form of the edited intermediate representations, makes the technique robust to inaccuracies and artifacts of the 3D surfaces and the approximate depth obtained from existing depth estimators is sufficient to allow for a wide range of 3D edits.

Where a communicatively coupled 3D graphics processing system is used for blocks 230-290, the third image can be output to the client device. The client device can update a suitable GUI to show the edited third image. In some examples, the latency between the client device and the 3D graphics processing system can be minimized to provide a near-real-time user experience to the user of the client device for interactive graphics editing.

3D Editing

Figure 3:
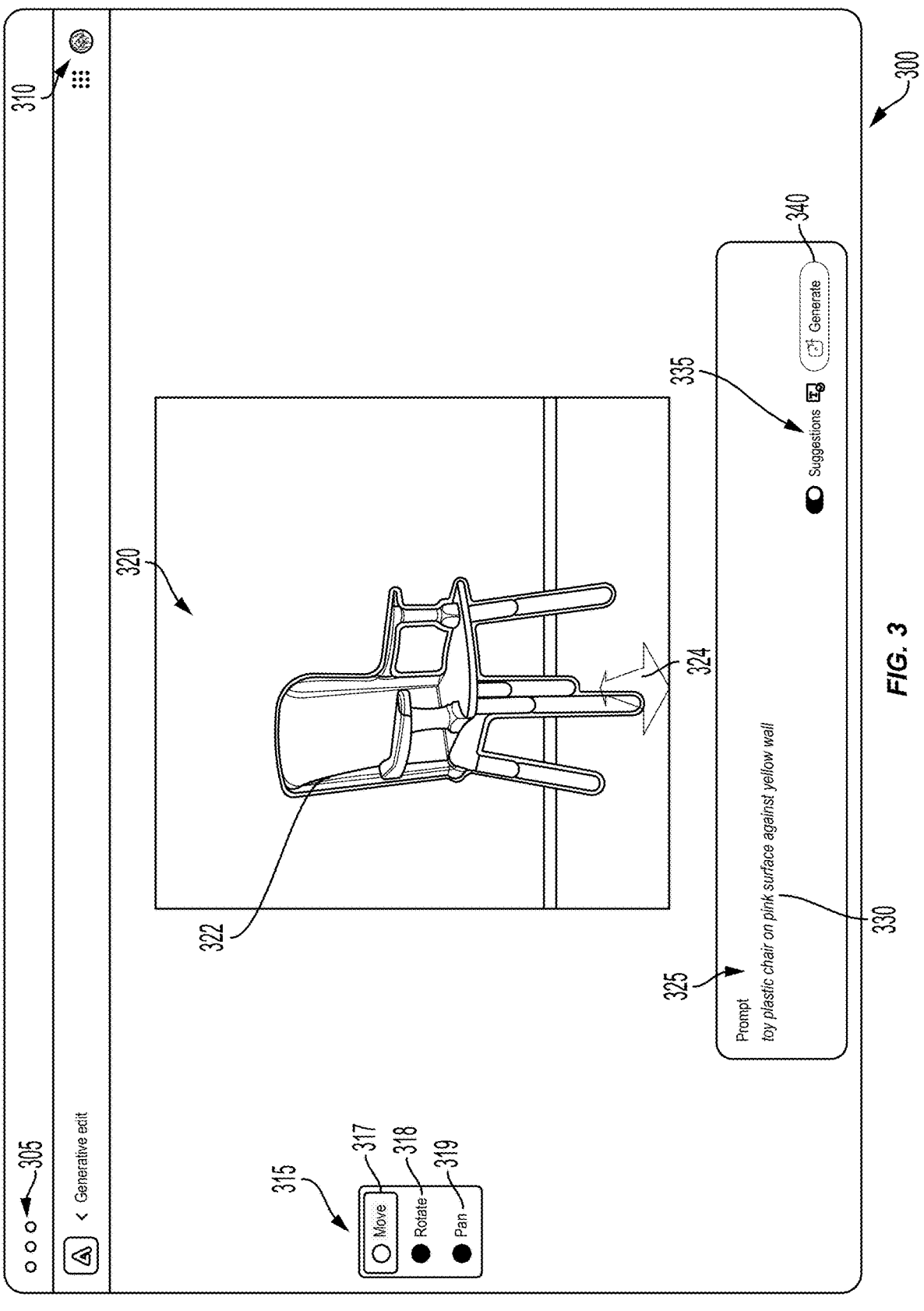
FIG. 3 depicts an example graphical user interface ("GUI") for 3D-aware transformations using a diffusion model, according to some examples of the present disclosure.

FIG. 3 depicts an example GUI 300 for 3D-aware transformations using a diffusion model, according to some examples of the present disclosure. GUI 300 includes window controls 305 for controlling the behavior of the editing window. The window controls 305 may be standard controls provided by the executing operating system. GUI 300 includes configuration controls 310 that can be used for updating personal, system, or application preferences.

GUI 300 includes 3D editing window 320 on which is shown a 3D object 322 (a chair) for editing overlaying a background. The background and 3D object 322 may be an image generated by a diffusion model, a photograph, drawing, scan, other AI-generated art, and so on. GUI 300 includes 3D transformation control panel 315 for selecting the editing mode for 3D editing window 320. 3D transformation control panel 315 includes sub-controls for movement (e.g., translating the 3D object 322) 317, rotation 318, and panning (e.g., translating the camera or point of view) 319. Other examples may include additional 3D transformations such as scaling, mirroring, flipping, and so on.

In example GUI 300, the movement sub-control 317 is selected which caused movement sliders 324 to be shown in the 3D editing window 320 for applying the selected transformation to the 3D object 322. In this example, the movement sliders 324 are arrows that can be dragged using a suitable input device to indicate a new location for the 3D object 322. Other sub-controls may have corresponding controls in the 3D editing window 320 such as buttons, arrows, menus, text inputs, drag-and-drop interfaces, and so on.

GUI 300 includes text input control 325 for inputting a text prompt corresponding to the scene shown in the 3D editing window 320. The GUI 300 may be configured to generate an image using a diffusion model based on a text prompt 330. In that case, the text prompt 330 can be entered into the text input control 325 and generation of the image can be caused by selection or operation of the generate button 340. In examples in which the scene shown in the 3D editing window 320 is loaded from a file or camera, the associated text prompt 330 can be entered manually or generative AI can be used to suggest a text prompt 330. The suggestion control 335 can be used to indicate that a suggestion for the text prompt 330 is desired.

Figures 4A, 4B, 4C:
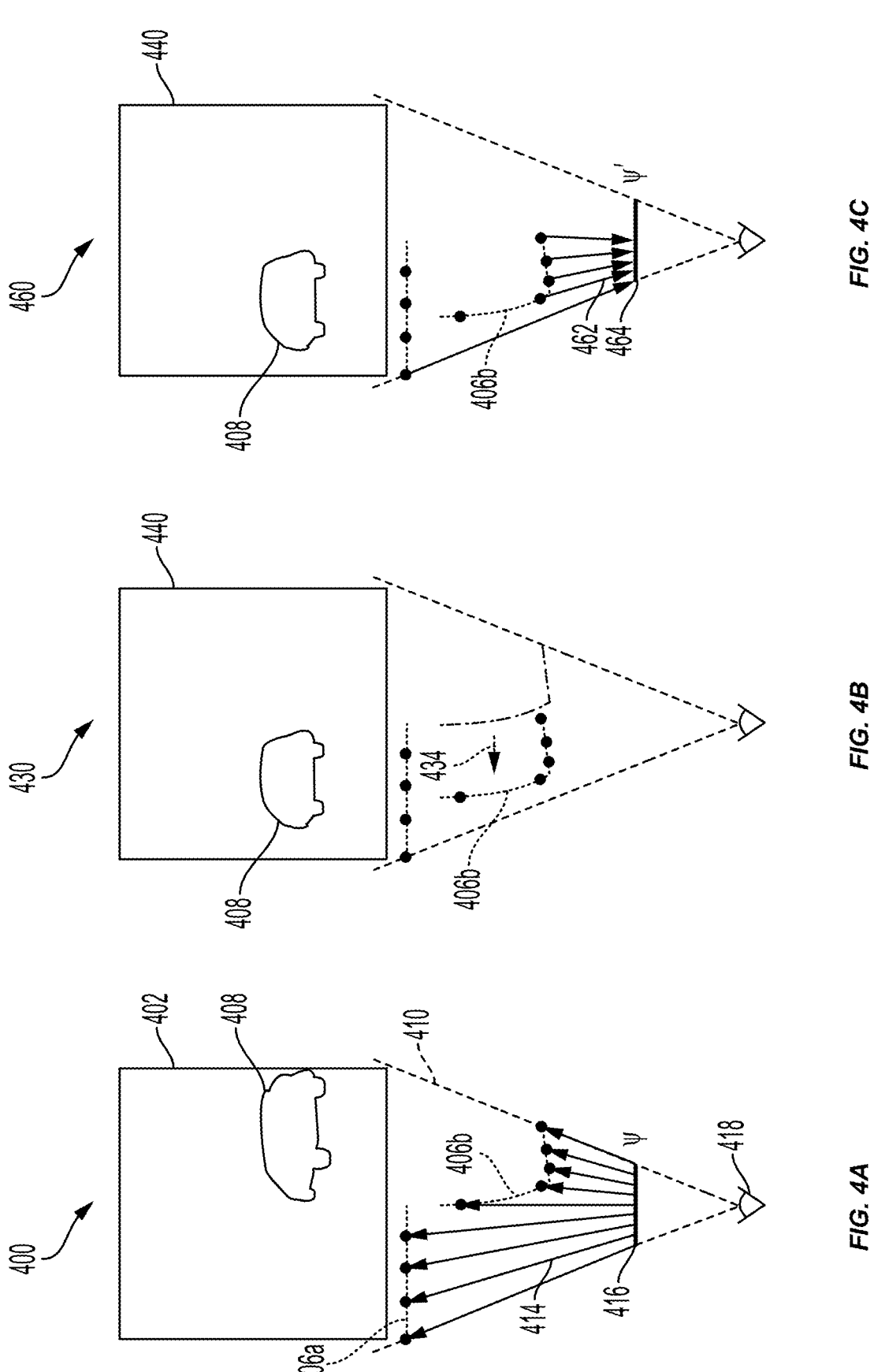
FIGS. 4A-4C show illustrations of the application of the input 3D transformation to the intermediate representations of the reconstructed input image, according to some aspects of the present disclosure.

FIGS. 4A-4C show illustrations of the application of the input 3D transformation to the intermediate representations of the reconstructed input image, according to some aspects of the present disclosure. The intermediate representations (e.g., activations) are lifted to a 3D surface, transformed in 3D space, and then projected back into the plane of the image.

FIG. 4A shows an illustration 400 of the generation of 3D representations from intermediate representations of an image being generated, according to some aspects of the present disclosure. Generation of the 3D representations from the intermediate representations can involve a lifting function. The lifting function $L_d$: $[0,1]^2 \rightarrow \mathbb{R}^3$ is used to assign a 3D coordinate to every point in the domain of the 2D signal X, based on the depth map 402 $d$. The illustration depicts the "lifting" schematically, showing a camera 418 with respect to the depth map 402 and a corresponding field of view 410. The angle of the field of view 410 may chosen according to factors such as the relative depth of the 3D objects in the input image, the resolution of the depth map, the accuracy or precision requirements of the particular 3D graphics editing application, and so on. In this example, the angle of the field of view 410 is fixed at 55 degrees.

An activation 416 is shown schematically as a horizontal line representing an edge-on view of a 2D plane that represents an internal state of a diffusion model during image generation. The lifting function maps the points of activation 416 to 3D representation 406*a,b*. The rays 414 are shown to illustrate the "lifting" of 2D data from activation 416 to 3D representation 406*a,b*. The 3D representation 406*a,b* is drawn with two parts to illustrate the portion of the 3D representation 406*a* corresponding to the depth map background and the portion of the 3D representation 406*b* corresponding to the 3D object 408. The portion of the 3D representation 406*b* constitutes the subject of the 3D edit described below with respect to FIGS. 4B-4C and 5.

In some examples, the 3D object 408 in depth map 402 can be identified using an image segmentation model. For example, an open-set segmentation approach starting from a bounding box identified using an object detection method can be used. The bounding box can be initially detected using an object detection method such as Grounding Detection transformers with Improved DeNoising ("DINO"). Grounding DINO is an example of an object detection ML model that can generate bounding boxes and labels by "grounding" textual descriptions in visual content. Once the initial bounding box is identified, an open-set segmentation approach such as a "Segment Anything Model" ("SAM") can be used to identify groups of 3D points that correspond to the 3D object 408. The SAM-type segmentation approach includes ML models trained for segmentation of images including objects not encountered during training.

In some examples, the graphic artist can select the 3D object 408 interactively using a suitable GUI. For example, the artist can describe the object with a text prompt and select one of the resulting candidate segments identified using the open-set segmentation approach.

The portion of the 3D representation 406*b* constitutes the subject of the 3D edit may be referred to as an object mask $M_o$. Lifting the object mask from the activation 416 to 3D representation 406*b* identifies the 3D points corresponding to the 3D object, which can then be manipulated by the user with a rigid 3D transformation (e.g., rotation, scaling, translation, etc.). The remainder of the 3D representation 406*a* is unaffected by the 3D object 408 and may, for example, represent the background or most distant depth of the depth map 402.

FIG. 4B shows an illustration 430 of the generation of transformed 3D representations from the 3D transformations through the application of a 3D transformation, according to some aspects of the present disclosure. The 3D transformation received by the 3D image editing system 100 defines a function T: $\mathbb{R}^3 \rightarrow \mathbb{R}^3$ that modifies the position of the 3D object 408 in space. The 3D transformation may be, for example, a rotation, a scaling, or a translation. In this example, the 3D transformation is shown schematically as translation 434 from right to left. The portion of the 3D representation 406*b* is correspondingly moved from right to left.

FIG. 4C shows an illustration 460 of the generation of a transformed intermediate representation for each of the transformed 3D representations, according to some aspects of the present disclosure. The portion of the 3D representation 406*b* that is the subject of the 3D edit, the 3D object 408, is projected to activation 464, a transformed intermediate representation of the intermediate state of the diffusion model. A projection function P: $\mathbb{R}^3 \rightarrow \mathbb{R}^2$ is used to project the 3D coordinates of the 3D representation portion 406*b* back to the 2D plane of the modified activation 464. The projection function P assumes the same camera 418 and other parameters (e.g., field of view) as the lifting function $L_d$. The rays 462 are shown to illustrate the projecting of the transformation orientation or position of the 3D object 408 onto the modified activation 464.

In some examples, the operations described above with respect to FIGS. 4A-4C can be composed to define a composite function for operating on the intermediate representations (e.g., activations 416, 464) that transforms the 2D coordinates of the 3D object 408 in the depth map 402 corresponding to the input image to the transformed position, orientation, and scale in the desired edited image. The defined composite function can be analogized to a warping mechanism $\mathcal{W}$ defined as $\mathcal{W}[X, F](u)=X(u-F(u))$, in which F is a flow field F: $[0,1]^2 \rightarrow \mathbb{R}^2$ and X is a signal (e.g., the input image) X: $[0, 1]^2 \rightarrow C$, and u is a coordinate in $[0,1]^2$, where C is the output domain of the mapping X. For example, for one example image, X can define a color for each location in the image plane. In that case, C could be the RGB color space. For the intermediate activations 416, 464, C can be a higher-dimensional feature space (e.g., $\mathbb{R}^n$) where n is the dimensionality of the features. The warping mechanism $\mathcal{W}$ thus represents, for each u, the value of the signal X following a displacement under the flow field F as defined below. In some examples, the warping mechanism $\mathcal{W}$ can be used to warp the depth map 402, where C is $\mathbb{R}^1$ and the intermediate activations 416, 464 are $\mathbb{R}^n$.

The composed flow field F is based on the inverse of the operations described above with respect to FIGS. 4A-4C:

$$F(u) = u - (P \circ T \circ L_d)^{-1}(u)$$

The warping mechanism $\mathcal{W}$ can be applied to an activation $\Psi_{i,t}$ 416 to obtain edited activation $$\Psi'_{i,t}$$

as $$\Psi'_{i,t} := \mathcal{W}[\rho(\Psi_{i,t}), F],$$

where $\rho$ denotes a bilinear interpolation.

In some cases, the flow field F may not be defined for some coordinates, since the composition $P \circ T \circ L_d$ is not always bijective. For example, application of the flow field F thus defined may create overlapping regions (e.g., occlusions) or holes (e.g., disocclusions). Various methods can be used to correct for overlapping regions or holes. For example, for overlapping regions, only the closest points to the field of view 410 may be used, by convention.

In another example, for holes, a valid mask $M_v$ defined as $M_v = \mathbb{1}_{range\ (P \circ T \circ L_d)}$ corresponding to regions of the 3D representation 406a, b that are not holes can be established, where $\mathbb{1}_{range\ (P \circ T \circ L_d)}$ denotes the indicator function for the subset range $(P \circ T \circ L_d)$. The indicator function, in this case, maps all elements of the subset range $(P \circ T \circ L_d)$ to 1 and all other elements not in range $(P \circ T \circ L_d)$ to 0. Then, the valid mask $M_v$ can be used to only guide regions inside the mask when generating the edited image. The valid mask $M_v$ thus maps all output image positions (e.g., all pixels) that are covered by the transformed 3D representation 406b to 1. As a result, the valid mask $M_v$ masks the parts of the output image domain that are covered by the transformed 3D representation 406b. Holes, or regions that are not covered by the transformed 3D representation 406b and about which no additional information is available (e.g., which region was originally occluded by the 3D object 408 in its original position), are outside the mask. The holes are subsequently not guided using the intermediate activation 414 since transformed intermediate activation 464 in these regions are not available due to the masking process.

A second depth map 440 is used to generate the edited image. To generate the second depth map 440, the 3D object portion of the edited, second depth map $$d'_o \textbf{440}$$

and the static background portion $$d'_b$$

are treated separately. By treating the 3D object portion $$d'_o$$

and the static background portion $$d'_b$$

separately, any holes in the background portion $$d'_b$$

created by the 3D edit (e.g., translating the 3D object) can be inpainted using priors of the diffusion model.

The depth for the background portion $$d'_b$$

can be obtained by removing the transformed 3D object 408 from the input image 112 using an object removal method, using the object mask $M_o$. The depth for the background portion $$d'_b$$

can be estimated from the resulting image using a monocular depth estimator. The depth of the 3D object portion $$d'_o$$

can be obtained by computing the distance between the camera 418 and the transformed 3D points represented by the composite function $T \circ L_d$ as $$d'_o(u) := \|\mathcal{W}[T \circ L_d, F](u)\|_2.$$

This equation is based on a coordinate system in which the camera 418 is at the origin. The depth for the background portion $$d'_b$$

and the depth of the 3D object portion $$d'_o$$

can be composited seamlessly using a suitable technique such as Poisson image editing to obtain the second depth map 440.

Method for 3D Editing

FIG. 5 is a flow diagram of an example process 500 for editing intermediate representations for 3D-aware transformations using a diffusion model, according to some examples of the present disclosure. The process 500 depicted in FIG. 5 may be implemented in software executed by one or more processing units of a processing device, implemented in hardware, or implemented as a combination of software and hardware. This process 500 is intended to be illustrative and non-limiting. The example process herein is described with reference to the examples depicted in FIGS. 4A-4C, but other implementations are possible. Although FIG. 5 depicts various processing operations occurring in a particular order, the particular order depicted is not required. In certain alternative embodiments, the processing may be performed in a different order, some operations may be performed in parallel, or operations may be added, removed, or combined together.

At block 510, a computing system receives an activation based on an internal state of a diffusion model, a depth map, the depth map including a 3D object, and information about a transformation of the 3D object. In some examples, editing the intermediate representations is performed by converting the depth map into a point cloud and then applying the desired 3D transformation, as described below. To obtain the point cloud, the depth map of the 3D object can be used. The depth map can be obtained either from a known template or by estimating it from the image.

At block 520, a computing system identifies the 3D object in the depth map using a segmentation technique. The computing system may be configured to precisely align the identified 3D object with the depth map. For example, when using an estimated depth map, disocclusions can result in unknown depth regions, leading to uncertainty and loss of identity when the transformation is large in magnitude, especially with large rotations.

At block 530, a computing system generates a 3D representation of the activation by, for each point in the activation, determining a corresponding 3D coordinate. For example, a lifting function can be used to assign a 3D coordinate to every point in the domain of the 2D activation, based on the depth map, as shown above in FIG. 4A.

At block 540, a computing system generates a transformed 3D representation based on the information about the 3D transformation by applying the 3D transformation to the 3D object. For example, the 3D transformation can defines a transformation function that modifies the position of the 3D object in space. The transformation function can be applied to the 3D representation, as shown above in FIG. 4B.

At block 550, a computing system generates a second depth map based on the depth map and the transformed 3D representation. Generation of the second depth map can be performed during blocks 520-540 based on the original input image, as shown above in FIG. 4C.

At block 560, a computing system generates a modified activation by projecting each point of the transformed 3D representation to the 2D plane of the activation. For example, a projection function can be used to project the 3D coordinates of the 3D representation back to the 2D plane of the activation, as shown above in FIG. 4C.

In some examples, the 3D editing steps of this process 500 can be composed to generate a composite operation or "flow transformation." For example, generating the 3D representations based on the first intermediate representations, generating the transformed 3D representations by applying the 3D transformation to each of the 3D representations, and generating the second intermediate representation for each of the transformed 3D representations may be a composite operation. The flow transformation can be applied (e.g., as a mathematical operator) to the one or more first intermediate representations to generate the second intermediate representations.

Computing Environment

Figure 6:
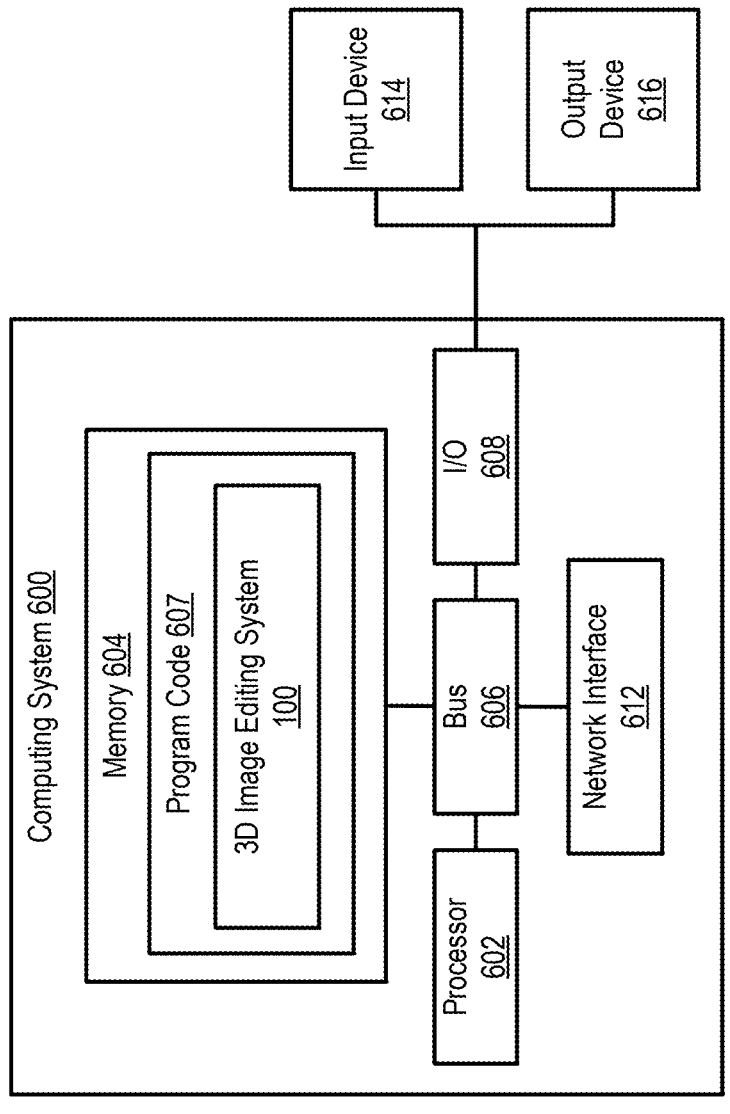
FIG. 6 depicts an example of a computer system that may be suitable for implementing 3D-aware transformations using diffusion models, according to some examples of the present disclosure.

Any suitable computer system or group of computer systems can be used for performing the operations described herein. For example, FIG. 6 depicts an example of a computer system 600. The depicted example of the computer system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 607, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 604 can be volatile memory, non-volatile memory, or a combination thereof.

The computer system 600 executes program code 607 that configures the processor 602 to perform one or more of the operations described herein. Examples of the program code 607 include, in various embodiments, the 3D image editing system 100 of FIG. 1, which may include any other suitable systems or subsystems that perform one or more operations described herein (e.g., one or more ML models, storage systems, controllers, or function-specific modules). The program code 607 may be resident in the memory device 604 or any suitable computer-readable medium and may be executed by the processor 602 or any other suitable processor.

The processor 602 is an integrated circuit device that can execute the program code 607. The program code 607 can be for executing an operating system, an application system or subsystem, or both. When executed by the processor 602, the instructions cause the processor 602 to perform operations of the program code 607. When being executed by the processor 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 604 store the program code 607 that includes one or more datasets described herein. In some embodiments, one or more of data sets are stored in the same memory device (e.g., one of the memory devices 604). In additional or alternative embodiments, one or more of the programs, data sets, models, and functions described herein are stored in different memory devices 604 accessible via a data network. One or more buses 606 are also included in the computer system 600. The buses 606 communicatively couple one or more components of a respective one of the computer system 600.

In some embodiments, the computer system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computer system 600 is able to communicate with one or more other computing devices via a data network using the network interface device 612.

The computer system 600 may also include a number of external or internal devices, an input device 614, an output device 616, or other input or output devices. For example, the computer system 600 is shown with one or more input/output ("I/O") interfaces 608. An I/O interface 608 can receive input from input devices or provide output to output devices. An input device 614 can include any device or group of devices suitable for receiving visual, auditory, or other suitable input that controls or affects the operations of the processor 602. Non-limiting examples of the input device 614 include a touchscreen, a mouse, a keyboard, a microphone, a separate mobile computing device, etc. An output device 616 can include any device or group of devices suitable for providing visual, auditory, or other suitable sensory output. Non-limiting examples of the output device 616 include a touchscreen, a monitor, a speaker, a separate mobile computing device, etc.

Although FIG. 6 depicts the input device 614 and the output device 616 as being local to the computer system 600, other implementations are possible. For instance, in some embodiments, one or more of the input device 614 and the output device 616 can include a remote client-computing device that communicates with computing system 600 via the network interface device 612 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

GENERAL CONSIDERATIONS

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more processing devices, comprising:

receiving a first image of a three-dimensional ("3D") object and a text prompt;

receiving an indication of a 3D transformation of the 3D object;

generating information about an initial state for a diffusion model using the first image;

generating, using the diffusion model, a second image of the 3D object and one or more first intermediate representations of the second image, based on the information about the initial state, a first depth map corresponding to the first image, and the text prompt;

generating one or more 3D representations of the second image based on the one or more first intermediate representations;

generating one or more transformed 3D representations of the second image by applying the 3D transformation to each of the one or more 3D representations;

generating a second intermediate representation for each of the transformed 3D representations;

generating, using the diffusion model and the one or more second intermediate representations, a third image of the 3D object, based on the information about the initial state, a second depth map, and the text prompt; and outputting the third image.

2. The method of claim 1, wherein the 3D transformation includes at least one of a rotation, scaling, or translation of the 3D object.

3. The method of claim 1, further comprising generating the first depth map corresponding to the first image using a monocular depth estimator.

4. The method of claim 1, wherein the information about the initial state for the diffusion model comprises a null-text encoding and initial noise.

5. The method of claim 4, wherein the information about the initial state for the diffusion model is generated using the diffusion model operating in reverse.

6. The method of claim 1, wherein generating the one or more 3D representations comprises determining a plurality of 3D coordinates based on the first depth map.

7. The method of claim 6, wherein applying the 3D transformation to each of the 3D representations comprises:

identifying a subset of 3D coordinates of the plurality of 3D coordinates corresponding to the 3D object; and generating a transformed subset of 3D coordinates by applying the 3D transformation to each 3D point of the subset of 3D coordinates.

8. The method of claim 7, wherein the subset of 3D coordinates is identified using an image segmentation model.

9. The method of claim 7, wherein generating the second intermediate representation for each of the transformed 3D representations comprises projecting the plurality of 3D coordinates and the subset of 3D coordinates to a 2D plane.

10. The method of claim 7, wherein the second depth map is generated by:

generating a fourth image comprising removing the 3D object from the first image based on the subset of 3D coordinates corresponding to the 3D object;

generating an intermediate depth map based on the fourth image; and generating the second depth map based on the intermediate depth map by determining a depth of the 3D object based on the transformed subset of 3D coordinates.

11. The method of claim 1, wherein generating the third image comprises configuring the diffusion model using an object guidance energy term and a background guidance energy term.

12. The method of claim 1, wherein generating the one or more 3D representations of the second image based on the one or more first intermediate representations, generating the one or more transformed 3D representations of the second image by applying the 3D transformation to each of the one or more 3D representations, and generating the second intermediate representation for each of the transformed 3D representations are a composite operation.

13. The method of claim 12, wherein:

the composite operation is a flow transformation for the one or more first intermediate representations; and generating the second intermediate representation comprises applying the flow transformation to each of the one or more first intermediate representations.

14. A system comprising:

one or more processors; and one or more computer-readable storage media storing instructions which, when executed by the one or more processors, cause the one or more processors to perform operations including:

receiving a first image of a three-dimensional ("3D") object and a text prompt;

receiving an indication of a 3D transformation of the 3D object; and outputting a second image of the 3D object, the second image received from a 3D graphics processing system in response to receiving the first image, the text prompt, and the indication, wherein the second image is generated using a diffusion model based on information about an initial state, a first depth map, and the text prompt, wherein:

the information about the initial state is generated based on the first image using the diffusion model in a reverse mode of operation; and the diffusion model is configured with one or more guidance energy terms based on one or more first intermediate representations, wherein:

the one or more first intermediate representations are generated using one or more respective transformed 3D representations, the one or more transformed 3D representations generated by applying the 3D transformation to each of one or more 3D representations of a third image generated using the diffusion model along with one or more second intermediate representations of the third image, based on the information about the initial state, a second depth map corresponding to the first image, and the text prompt.

15. The system of claim 14, wherein the 3D transformation includes at least one of a rotation, scaling, or translation of the 3D object.

16. The system of claim 14, wherein:

generating the one or more 3D representations comprises determining a plurality of 3D coordinates based on the second depth map;

applying the 3D transformation to each of the 3D representations comprises:

identifying a subset of 3D coordinates of the plurality of 3D coordinates corresponding to the 3D object; and generating a transformed subset of 3D coordinates by applying the 3D transformation to each 3D point of the subset of 3D coordinates; and generating the first intermediate representation for each of the transformed 3D representations comprises projecting the plurality of 3D coordinates and the subset of 3D coordinates to a 2D plane.

17. The system of claim 14, wherein generating the second image comprises configuring the diffusion model using an object guidance energy term and a background guidance energy term.

18. A non-transitory computer-readable medium storing instructions that, when executed by one or more processors, cause the one or more processors to perform operations including:

receiving a first image of a three-dimensional ("3D") object and a text prompt;

receiving an indication of a 3D transformation of the 3D object;

generating information about an initial state for a diffusion model using the first image;

generating, using the diffusion model, a second image of the 3D object and one or more first intermediate representations of the second image, based on the information about the initial state, a first depth map corresponding to the first image, and the text prompt;

generating one or more 3D representations of the second image based on the one or more first intermediate representations;

generating one or more transformed 3D representations of the second image by applying the 3D transformation to each of the one or more 3D representations;

generating a second intermediate representation for each of the transformed 3D representations;

generating a second depth map based on the first image and the 3D transformation;

generating, using the diffusion model and the one or more second intermediate representations, a third image of the 3D object, based on the information about the initial state, the second depth map, and the text prompt; and outputting the third image.

19. The non-transitory computer-readable medium of claim 18, wherein:

generating the one or more 3D representations comprises determining a plurality of 3D coordinates based on the first depth map;

applying the 3D transformation to each of the 3D representations comprises:

identifying a subset of 3D coordinates of the plurality of 3D coordinates corresponding to the 3D object; and generating a transformed subset of 3D coordinates by applying the 3D transformation to each 3D point of the subset of 3D coordinates; and generating the second intermediate representation for each of the transformed 3D representations comprises projecting the plurality of 3D coordinates and the subset of 3D coordinates to a 2D plane.

20. The non-transitory computer-readable medium of claim 18, wherein generating the third image comprises configuring the diffusion model using an object guidance energy term and a background guidance energy term.

* * * * *